United States Patent [19]

Bald, Jr.

[11] 3,811,948

[45] May 21, 1974

[54] INORGANIC THERMAL REACTION BATTERY

[75] Inventor: James F. Bald, Jr., Jersey City, N.J.

[73] Assignee: The United States of America as represented by the Secretary of the Army, Washington, D.C.

[22] Filed: Feb. 22, 1972

[21] Appl. No.: 228,292

[52] U.S. Cl. .............................. 136/83 T, 136/153
[51] Int. Cl. ......................................... H01m 21/14
[58] Field of Search.............. 136/83, 153, 154, 6 L, 136/6 LF, 6 LN

[56] References Cited
UNITED STATES PATENTS

| | | | |
|---|---|---|---|
| 3,725,132 | 4/1973 | Moser et al. ..................... | 136/83 T |
| 3,704,221 | 11/1972 | McCully ............................. | 136/153 |
| 3,318,734 | 5/1967 | McCully ........................... | 136/83 T |

*Primary Examiner*—A. B. Curtis
*Assistant Examiner*—C. F. Lefevour
*Attorney, Agent, or Firm*—Edward J. Kelly; Herbert Berl; Saul Elbaum

[57] ABSTRACT

A thermally activated electrical storage device including a non-conducting solid material capable of being thermally decomposed or pyrolyzed to form a liquid conductive electrolyte in combination with a means for heating the non-conducting solid material to at least its thermal decomposition or pyrolytic temperature, and is useful in the field of ordnance projectiles, missiles and the like.

6 Claims, No Drawings

INORGANIC THERMAL REACTION BATTERY

BACKGROUND OF THE INVENTION

This invention relates essentially to thermally activated electrical storage devices utilizing an electrically non-conducting solid material capable of being thermally decomposed or pyrolyzed to form a liquid conductive electrolyte.

In the field of ordnance projectiles, missiles and the like, it is necessary to utilize thermoelectric generators which are small in size, simple, have a long storage life and are operable over wide temperature ranges. Although conventional thermoelectric generators of this type are satisfactory for many applications, none has been found to be wholly satisfactory for use in projectile fuse batteries.

The typical thermal battery is based upon the use of an inorganic salt, e.g., sodium chloride, as the electrolyte. Under normal storage conditions the salt is conductively ineffective as a solid. Upon activation by means of a pyrotechnic heat charge, thereby causing the salt to melt into a molten state, the salt becomes conductively effective thereby permitting ionic transfer of electricity between the electrodes.

Typical inorganic salts or eutectic salt mixtures melt at about 350° to 500°C. Consequently, in thermal batteries, it is necessary to heat the inorganic salt electrolytes to even higher temperatures in order to insure that the electrolyte remains in a molten or liquid state for the desired length of time. However, space limitations in projectile-fuse batteries make it difficult to provide sufficient thermal insulation for the electrolyte. Consequently, heat is rapidly lost with the salt refreezing resulting in the deactivating of the battery and any excessive pyrotechnic heating that might occur might have a detrimental effect on electronic components used in conjunction with the fuse. Typically, the useful life of such a battery is about 30 seconds.

A great need, therefore, exists for the development of a thermal battery which is operable over a wide temperature range and does not become deactivated when subjected to sub-zero temperatures as low as about −40°C. Moreover, a need also exists for a thermal battery that can be activated at a temperature which is not detrimental to electronic components used in conjunction with the battery.

OBJECTS OF THE INVENTION

Accordingly, it is a significant object of the present invention to provide a thermal battery having a satisfactorily long storage life and capable of being used over a wide temperature range without having the battery become deactivated thereby enabling the battery to be used at sub-zero conditions and at elevated temperatures.

Another object of the present invention is to provide a thermal battery which can be thermally activated at a temperature which is sufficiently lower than conventional thermal batteries so as not to have any detrimental effects on electronic components used in conjunction therewith.

Another closely related but yet still significant object of this invention is the provision of a solid electrically non-conductive material which undergoes an irreversible chemical change and becomes a liquid conductive electrolyte over a wide temperature range by subjecting the solid electrically non-conductive material to a pyrolytic or thermal decomposing temperature.

A still further object of this invention is the provision of an electrolyte precursor which, upon pyrolysis or thermal decomposition, yields from one to eight moles of solvent per mole of conductive salt.

An additional object of the invention is the provision of an electrolyte precursor which enables the user of the thermal battery to attain a wide range of conductivities for a given system.

The invention will be better understood and objects other than those set forth above will become apparent after reading the following detailed description of preferred, yet illustrative, embodiments hereof.

BRIEF SUMMARY OF THE INVENTION

It has now been discovered that these and other objects may be accomplished by employing, in a thermally activated electrical storage device, an electrically non-conducting solid material capable of being thermally decomposed or pyrolyzed to form a liquid conductive electrolyte in combination with a means for heating said solid material to at least its pyrolytic or thermal decomposition temperature.

The liquid conductive electrolytes produced in accordance with this invention are useful over a wide range of temperatures thereby extending the useful life of a thermal battery for considerably longer periods of time than conventional thermal batteries. Moreover, the storage life of the battery is considerably longer than the ordinary thermal battery since the electrolytic precursor is solid and non-conductive prior to activation. In accordance with this invention, the electrolyte precursor undergoes an irreversible chemical change thereby altering its physical properties; whereas in all other batteries the electrolyte only undergoes a physical change and the life of the battery is therefore limited by the amount of time it takes for the temperature to fall to the melting point (i.e., freezing point) of the electrolyte.

DETAILED DESCRIPTION OF THE INVENTION

More specifically, the non-conductive solid electrolyte precursor is a coordination compound, an inorganic adduct or a mixture thereof.

The solid, non-conductive coordination compounds useful in the practice of this invention may include compounds of the formula:

$$M(L)_m X_n$$

wherein M is a transition metal ion, L is a ligand, X is an inorganic substituent or anion, $m$ is the coordination number of the central metal, and $n$ is an integer equal to the valence of M. It is understood that the integer $n$ has a value such that the complex is a neutral compound, i.e., $n$ multiplied by the charge of the anion equals the formal charge on the metal ion.

Preferred transition metal ions include those metal ions which are members selected from Groups IB, IIB and VIB to VIIIB of the Mendeleyev Periodic Table of Elements. Particularly preferred metal ions and the valence state of each of the same include the following: Cr(II), Cr(III), Mn(II), Co(II), Co(III), Ni(II), Pt(II), Pd(II), Fe(II), Cu(II), Hg(II) and Zn(II). The coordination number $m$ of the compound has a value of at least one and is generally between one and eight.

When the coordination compounds of the invention are subjected to thermal decomposition and/or pyrolytic temperatures, the coordination compounds are caused to undergo an irreversible chemical change resulting in the formation of a liquid conductive electrolyte comprising an ionizable inorganic salt of the formula $MX_n$ and a solvent L for said salt corresponding to the ligand L in the coordination compound. Ligands used in formulating the coordination compounds include the Lewis bases.

The ligands upon becoming a solvent after the thermal decomposition or pyrolysis of the coordination compound have a dielectric constant sufficient for an appreciable amount of salt $MX_n$ to be dissolved therein. Generally, the dielectric constant of the solvent is at least about 12. Preferred ligands L and solvents include secondary and tertiary aliphatic and aromatic amines, heterocyclic nitrogen compounds and trialkyl and trialkoxy phosphines, dialkylsulfoxides, alkyl and aryl nitriles and isonitriles. Examples of the preferred ligands include diethylsulfoxide, dimethylsulfoxide, benzonitrile, hexanenitrile, pentanedinitrile, phenylisocyanide, triethoxyphosphine, quinoline and pyridine.

The inorganic substituent or anion X in combination with the transition metal M is an ionizable inorganic salt or Lewis acid which is primarily responsible for the conductivity of the electrolyte. Examples of X include carbonate, nitrate and halide with the latter being particularly preferred.

A typical thermal decomposition of a coordination compound would involve the pyrolysis of manganese (II) pyridine (PY) complexes, for example:

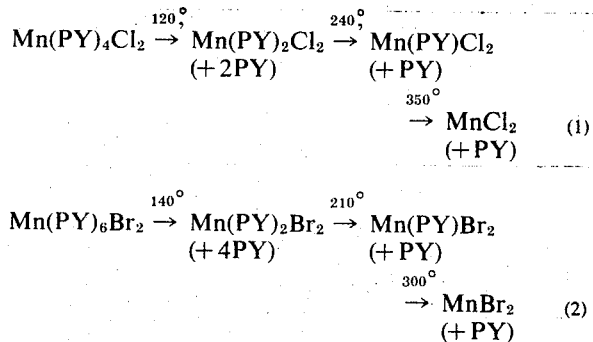

It should be noted in Equations (1) and (2) that 6 and 4 moles of free pyridine are released respectively for each mole of starting material. It should also be noted that a battery system utilizing the bromide complex could conceivably be activated at temperatures as low as 150°C. and still have considerable pyridine solvent available to dissolve the remaining intermediates and produce a conductive solution.

Nickel (II) quinoline (quin) complexes also decompose thermally to give free quinoline and the corresponding nickel (II) salt, viz.,

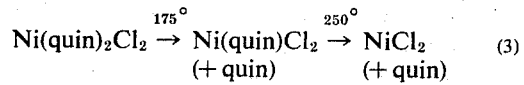

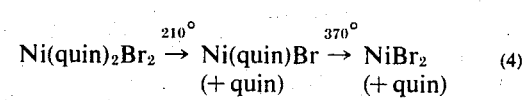

The solid, non-conductive inorganic adducts which have been found to be particularly useful in the practice of this invention are Lewis acid-base adducts and include those adducts of the formula:

$$M'H_4 \cdot n'L$$

wherein M' is an atom selected from Groups IIIA to IVA of the Mendelyeev Periodic Table of Elements; H is a halide and preferably a chloride ion; $n'$ has a value from two to four; and L has the same meaning defined hereinbefore and yields a solvent L having a dielectric constant of at least about 12 when said adduct is subjected to thermal decomposition and/or pyrolyzing temperatures.

Particularly useful Lewis acids used to formulate the above adducts include $SiCl_4$, $SiBr_4$, $SiI_4$, $GeCl_4$, $SnCl_4$, $Al_2Cl_6$, $BCl_3$.

Typical adducts which can be employed as the electrolyte precursors include the tetrapyridine adduct of silicon tetraiodide, the dipyridine adduct of germanium tetrabromide and the tin or aluminum halides in combination with amines or phosphines.

The thermal decomposition of an inorganic adduct can be illustrated by considering the tetrapyridine adduct of silicon tetraiodide, $SiI_4 \cdot 4PY$. This compound has been formulated as containing the cation $[SiI_2 \cdot 4PY]^{2+}$. Upon pyrolysis it is believed that decomposition occurs as follows:

$$[SiI_2 \cdot 4PY]^{2+} + 2I^- \xrightarrow{\Delta} [SiI_2 \cdot 2PY]^{2+} + 2I^- + 2PY \quad (5)$$

Similarly adducts of germanium can also be considered:

$$GeBr_4 \cdot 2PY \xrightarrow{\Delta} GeBr_4 \cdot PY + PY \quad (6)$$

Normal (as opposed to acid or basic) salts can be used in combination with the solid non-conductive coordination compounds or adducts in order to enhance the electrolytic conductivity of the electrolytes formed therefrom. The unexpectedly large amounts of polar solvent produced by the thermal decomposition or pyrolysis of the electrolyte precursor renders the dissolution of the normal salts a very practical course of action thereby enabling the user to attain a wide range of conductivities for a given electrolyte.

Generally, the only limitations governing the selection of a particular normal salt, or mixture thereof, is the chemical and thermal stability of the salt and its compatibility with the electrolyte precursor and the resultant electrolyte, i.e., the solvent and acid salt. Particularly useful normal salts for this invention include the alkali metal and alkaline earth metal salts and preferably the halides of sodium, potassium rubidium, cesium, magnesium, calcium and strontium.

The addition of the normal salts is largely determined by the conductance required in a battery system which is dependent upon cell characteristics and amperage characteristics. Thus, if a given chemical species does not thermally decompose or pyrolyze to provide an electrolyte having a sufficient conductance, the conductance of the electrolyte can be raised to the desired level by the addition of the requisite amount of additional normal salt, usually by admixing the same with the electrolyte precursor. Although the amount of salt that might be required is dependent on each specific case, it is generally preferred, according to this embodiment of the invention, to add the normal salt in an amount sufficient for the electrolyte to contain at least about 0.2 moles per liter of solvent. The total maximum concentration of normal salt in the solvent should be no greater than about 2.0 moles per liter.

Since the electric energy storage device must be thermally activated in order for the device to function in its desired manner, the above-mentioned electrically non-conducting solid materials or precursors are provided with a means for heating the solid material to at least its pyrolyzing or thermal decomposition temperature in order to form a liquid conductive electrolyte. As a result, an electrochemical reaction takes place causing the generation of electrical energy. The heating means used to activate the electrical energy storage device can include any number of devices presently used to activate thermal batteries, e.g., an external heating means such as an oven or a heat generating material or element within the cell assembly.

The temperature at which the battery operates is not critical and, as stated heretofore, has operability over a wide temperature range. For example, an electrolyte precursor can be provided which upon thermal decomposition or pyrolysis forms an electrolyte having a minimum useful temperature range considerably below the thermal decomposition or pyrolysis temperature of the precursor and at sub-zero temperatures, temperatures above which most existing electrolytes freeze or the components separate. Thus, these batteries will find use in arctic climates. on the other hand, the high temperatures at which these batteries also operate, enables the batteries to be used in a variety of specialized purposes, particularly missile applications. This flexibility in temperature range can also eliminate the problem of short "shelf life" so acute in standard batteries.

It should be understood that the invention is not limited to the exact details of construction shown and described herein for obvious modifications will occur to persons skilled in the art.

What is claimed is:

1. In a thermally activated electrical storage device, the improvement which comprises:
   a. a non-conducting solid material capable of being thermally decomposed or pyrolyzed to form a liquid conductive electrolyte; and
   b. means for heating said solid material to at least its pyrolytic or thermal decomposition temperature;
   said non-conducting solid material being either a coordination compound of the formula:

$$M(L)_m X_n$$

wherein M is a transition metal ion, L is a Lewis base, X is an inorganic substituent, $m$ is the coordination number and has a value of at least 1, and $n$ is an integer equal to the valence of M, or an inorganic adduct of the formula:

$$M'X_4 \cdot n'L$$

wherein M' is a Group IIIA–IVA ion, X is a halide, L has the same meaning as defined hereinbefore and n' is between 2 and 4, or a mixture thereof.

2. A device according to claim 1 wherein said non-conducting solid coordination compound is characterized by undergoing thermal decomposition or pyrolysis at a temperature of at least about 150°C. to form a liquid conductive electrolyte comprising a salt of the formula $MX_n$ and m moles of a polar solvent L.

3. A device according to claim 2 wherein said solvent L has a dielectric constant of at least about 12 and said electrolyte contains about 1 to 8 moles of said solvent per mole of salt.

4. A device according to claim 3 wherein said coordination compound is a manganous pyridine complex of the formula $Mn(C_6H_5N)Cl_2$ and upon being heated to a temperature sufficient to cause the thermal decomposition or pyrolysis of said coordination compound, 4 moles of $C_6H_5N$ solvent per mole of $MnCl_2$ are formed.

5. A device according to claim 1 wherein said non-conducting inorganic adduct is characterized by undergoing thermal decomposition or pyrolysis at a temperature of at least about 150° to form a liquid conductive electrolyte comprising a salt of the formula $MX_4$ and 2 moles of polar solvent L.

6. A device according to claim 5 wherein said adduct is the tetrapyridine adduct of silicon tetraiodide.

* * * * *